US00RE35777E

United States Patent [19]

Givin

[11] E Patent Number: Re. 35,777

[45] Reissued Date of Patent: Apr. 28, 1998

[54] SELF STITCHING MULTILAYER PAPERMAKING FABRIC

[75] Inventor: William R. Givin, East Harwich, Mass.

[73] Assignee: Huyck Licensco, Inc., Wilmington, Del.

[21] Appl. No.: 129,674

[22] Filed: Sep. 30, 1993

Related U.S. Patent Documents

Reissue of:

[64] Patent No.: 5,052,448
Issued: Oct. 1, 1991
Appl. No.: 309,785
Filed: Feb. 10, 1989

[51] Int. Cl.[6] ..... D03D 11/00

[52] U.S. Cl. ..... 139/383 A; 139/414

[58] Field of Search ..... 139/383 A, 425 A

[56] References Cited

U.S. PATENT DOCUMENTS

| | | |
|---|---|---|
| 173,677 | 2/1876 | Scheppers . |
| 636,482 | 11/1899 | Barrell . |

(List continued on next page.)

FOREIGN PATENT DOCUMENTS

| | | | |
|---|---|---|---|
| 274124 | 8/1963 | Australia . | |
| 597864 | 8/1988 | Australia . | |
| 731243 | 12/1942 | Germany . | |
| 3224236 | 3/1984 | Germany | 139/383 A |
| 3329740 | 3/1985 | Germany | 139/383 A |
| 4015842 | 7/1965 | Japan . | |
| 61-275493 | 12/1986 | Japan . | |
| 62-97994 | 5/1987 | Japan . | |
| 62-162091 | 7/1987 | Japan . | |
| 63-145496 | 6/1988 | Japan . | |
| 63-50471 | 10/1988 | Japan . | |
| 307728 | 3/1963 | Sweden . | |
| 451752 | 8/1936 | United Kingdom . | |

OTHER PUBLICATIONS

Volpe, Anthony S, Esq; May 19, 1995 Letter to Judge Roderick McKelvie with attachments.

*Paper Machine Felts and Fabrics,* Albany International Corporation, 1976, pp. 20–27.

*The Design of Textiles For Industrial Applications,* P.W. Harrington (ed.), The Textile Institute, Manchester, UK pp. 40–51, 1977.

*The Modern Textile Dictionary,* G.E. Linton; Duell, Sloan and Pearce, 1963, pp. 306–309.

Affidavit of Floyd R. Lathbury.

"Huyck Formex Innovation Continues with Development of Titan 400"—Jack O'Brien—*Paper Age,* Nov. 1989, pp. 8, 27.

Industrial Fabrics A Handbook for engineers, Purchasing Agents and Salesmen by George B. Haven, S.B., First Edition, Wellington Sears Company, 1934, p. 179.

Callaway Textile Dictionary by W. L. Carmichael et al, First Edition, Callaway Mills, La Grange, Georgia, 1947, p. 306.

(List continued on next page.)

*Primary Examiner*—Andy Falik
*Attorney, Agent, or Firm*—Lorusso & Loud

[57] ABSTRACT

A multi-layer self-stitched papermakers' fabric including a top fabric layer of relatively fine machine direction and cross machine direction yarns and a bottom fabric layer of relatively coarse machine direction and cross machine direction yarns, interwoven to produce seating and self-stitching conditions for optimal drainage. In a preferred embodiment, the top fabric layer has a right to left twill on its upper papermaking surface and the bottom fabric layer has a left to right twill on its upper interlacing surface.

The questions raised in reexamination request No. 90/003, 352, filed Mar. 7, 1994, have been considered and the results thereof are reflected in this reissue which constitutes the reexamination certificate required by 35 U.S.C. 307 as provided in 37 CFR 1.570(e).

29 Claims, 11 Drawing Sheets

U.S. PATENT DOCUMENTS

| | | | |
|---|---|---|---|
| 1,879,243 | 6/1932 | Hoffacker . | |
| 1,983,352 | 12/1934 | Ellis . | |
| 1,991,366 | 2/1935 | Barrell . | |
| 1,994,280 | 3/1935 | Hindle . | |
| 2,047,542 | 2/1936 | Barrell . | |
| 2,157,082 | 5/1939 | Milnes . | |
| 2,180,054 | 11/1939 | Hindle et al. . | |
| 2,713,193 | 7/1955 | Robbins et al. . | |
| 2,742,059 | 4/1956 | Watts . | |
| 2,862,283 | 12/1958 | Rasero . | |
| 2,934,097 | 4/1960 | Hindle et al. . | |
| 2,936,796 | 5/1960 | Hindle et al. . | |
| 2,949,134 | 8/1960 | Hindle et al. . | |
| 3,127,308 | 3/1964 | Justus et al. . | |
| 3,207,659 | 9/1965 | Wagner . | |
| 3,214,326 | 10/1965 | Lee . | |
| 3,214,329 | 10/1965 | Wicker . | |
| 3,222,246 | 12/1965 | Lee . | |
| 3,325,909 | 6/1967 | Clark . | |
| 3,573,164 | 3/1971 | Friedberg . | |
| 3,885,602 | 5/1975 | Slaughter . | |
| 3,885,603 | 5/1975 | Slaughter . | |
| 4,041,989 | 8/1977 | Johannson et al. . | |
| 4,141,388 | 2/1979 | Romanski et al. . | |
| 4,186,780 | 2/1980 | Josef et al. . | |
| 4,289,173 | 9/1981 | Miller . | |
| 4,359,069 | 11/1982 | Hahn . | |
| 4,361,618 | 11/1982 | Dufour et al. . | |
| 4,403,632 | 9/1983 | Romanski et al. . | |
| 4,499,927 | 2/1985 | Borel . | |
| 4,501,303 | 2/1985 | Osterberg . | |
| 4,515,853 | 5/1985 | Borel . | |
| 4,554,953 | 11/1985 | Borel et al. . | |
| 4,564,051 | 1/1986 | Odenthal | 139/425 A |
| 4,564,052 | 1/1986 | Borel . | |
| 4,569,375 | 2/1986 | Borel . | |
| 4,592,396 | 6/1986 | Borel et al. . | |
| 4,611,639 | 9/1986 | Bugge . | |
| 4,642,261 | 2/1987 | Fearnhead . | |
| 4,705,001 | 11/1987 | Chiu | 139/425 A |
| 4,709,732 | 12/1987 | Kinnunen . | |
| 4,729,412 | 3/1988 | Bugge . | |
| 4,759,975 | 7/1988 | Sutherland et al. . | |
| 4,759,976 | 7/1988 | Dutt . | |
| 4,815,499 | 3/1989 | Johnson . | |
| 4,821,780 | 4/1989 | Tate . | |
| 4,867,206 | 9/1989 | Kufferath . | |
| 4,921,750 | 5/1990 | Todd . | |
| 4,928,737 | 5/1990 | Borel . | |
| 4,945,952 | 8/1990 | Vohringer | 139/383 A |
| 4,974,642 | 12/1990 | Taipale . | |
| 5,013,330 | 5/1991 | Durkin et al. . | |
| 5,056,565 | 10/1991 | Kufferath . | |

OTHER PUBLICATIONS

Huyck/Formex Ad, Mar. 1985 (2 sided) Paper Trade Journal pp. 60–61.

Huyck/Formex Ad, May 1982 (2 sided) Southern Pulp and Paper pp. 42–43.

Huyck/Formex Ad, May 1984 (2 sided) Pulp and Paper pp. 74–75.

Fabric Sample Notes Mar. 12, 1987 with support document.

Comput–A–Fabric Notes Design 421 Jan. 16, 1986.

Albany International Ad, Feb. 1986 (2 sided).

SELF STITCHING MULTILAYER PAPERMAKING FABRIC

Matter enclosed in heavy brackets [ ] appears in the original patent but forms no part of this reissue specification; matter printed in italics indicates the additions made by reissue.

BACKGROUND OF THE INVENTION

This invention relates to woven papermakers' fabrics and especially to forming fabrics, including those known as fourdrinier wires.

In the conventional fourdrinier papermaking process, a water slurry or suspension of cellulosic fibers, known as the paper "stock", is fed onto the top of the upper run of a traveling endless belt or fabric of woven wire and/or synthetic material. The belt provides a papermaking surface and operates as a filter to separate the cellulosic fibers from the aqueous medium to form a wet paper web. In forming the paper web, the forming belt serves as a filter element to separate the aqueous medium from the cellulosic fibers by providing for the drainage of the aqueous medium through its mesh openings, also known as drainage holes. In the conventional fourdrinier machine, the forming fabric also serves as a drive belt. Accordingly, the machine direction yarns are subjected to considerable tensile stress and, for this reason, are sometimes referred to as the load bearing yarns. Additionally, the cross machine direction yarns on the bottom surface of the forming fabric are subjected to the abrasive forces of the paper machine elements and, for this reason, are often times referred to as the wear resisting yarns.

Such papermakers' fabrics are manufactured in two basic ways to form an endless belt. First, they can be flat woven by a flat weaving process with their ends joined by any one of a number of well known methods to form the endless belt. Alternatively, they can be woven directly in the form of a continuous belt by means of an endless weaving process. In a flat woven papermakers' fabric, the warp yarns extend in the machine direction and the filling yarns extend in the cross machine direction. In a papermakers' fabric having been woven in an endless fashion, the warp yarns extend in the cross machine direction and the filling yams extend in the machine direction. As used herein, the terms "machine direction" and "cross machine direction" refer respectively to a direction equivalent to the direction of travel of the papermakers' fabric on the papermaking machine and a direction transverse to this direction of travel. Both methods are well known in the art and the term "endless belt" as used herein refers to belts made by either method.

Effective sheet support and minimal wire marking are important goals in papermaking, especially for the belt in the section of the papermaking machine where the wet web is formed. The fibers in the slurry to form the paper are generally of relatively short length. Accordingly, in order to ensure good paper quality, the side of the papermakers' fabric which contacts the paper stock should provide high support for the stock, preferably in the cross machine direction because paper fibers delivered from the headbox to the forming fabric are generally aligned in the machine direction more so than they are aligned in the cross machine direction. Retaining these paper fibers on the top of the forming fabric during the drainage process is more effectively accomplished by providing a permeable structure with a paper contacting surface grid configuration that increases the probability that paper fibers will be supported. Thus the grid spans in both directions should be shorter than the paper fibers so that a high percentage of bridging occurs.

However, if the grid configuration of papermakers' fabric were designed with only fiber retention in mind, such forming fabrics would probably be delicate and lack stability in the machine direction and cross machine direction, leading to a short service life. As noted above, abrasive wear caused by contact with the papermaking machine equipment is a real problem. The side of the papermakers' fabric which contacts the paper machine equipment must be tough and durable. These qualities, however, most often are not compatible with the good drainage and fiber supporting characteristics desired for the sheet side of the papermakers' fabric.

Hence, the ideal papermaking fabric must be fine enough to support and retain a high percentage of the deposited paper fibers, durable enough to withstand wear and give adequate life, strong enough to resist tensile forces to minimize stretching, and open enough to provide drainage and to simplify cleaning. Meeting these multiple criteria generally requires that two layers of fabric be woven at once by utilizing threads of different size and/or count per inch for the sheet making portion and the wear/stretch resisting portion respectively.

In fabrics thus created from two distinct fabrics, the final fabric would have the desirable papermaking qualities on the surface that faces the paper web and the desirable wear resistance properties on the machine contacting surface. In practice, such papermakers' fabrics are produced from two separate fabrics, one having the qualities desired for the paper contacting side and the other with the qualities desired on the machine contacting side and then the two fabrics are stitched together by additional stitching yarns as a single papermakers' fabric. This type fabric is commonly called a triple-layer or TRI-X fabric.

The main problem with so-called triple-layer or TRI-X fabrics wherein the two fabric layers are connected with additional stitching yarns is that an optimum geometry relationship between the two fabric layers is not generally achievable. In practice, the two fabric layers nest together with the bottom surface of the top fabric down in the top surface of the bottom fabric, that is the yarn systems in both directions, machine direction and cross machine direction, in both fabrics, the top fabric and the bottom fabric, are unstacked relative to each other. Therefore, although the drainage holes in the top fabric may be uniform, the individual drainage paths through the composite structure can vary due to the nesting nature of the totally unstacked structure. This unequal or non-uniform drainage path condition can be further aggravated through the addition of the independent stitching yarns required to tie both fabrics together.

Other undesirable aspects of independently stitched and totally unstacked or intimately nested so-called triple-layer forming fabrics include reduction in potential permeability and susceptibility to stitch yarn failure and subsequent ply separation. The lessened permeability can adversely affect slurry drainage, sheet knockoff capability and fabric cleaning efficiency. The stitching yarn failure can occur externally, that is on the sheet side surface or on the machine side surface, or internally, that is within or between the top fabric and the bottom fabric, depending upon the degree of burial below the respective surfaces in the one case and the amount of movement between the two fabrics in the other case. For obvious geometric reasons the stitching yarn in an independently stitched triple-layer fabric must be a relatively small diameter yarn; hence it is often hard pressed to withstand the imposed tensile and abrasive forces. Yet another drawback of independently stitched so-called triple-layer forming fabrics is increased production costs. Where the stitching yarns are inserted as picks or shutes the weaving time is at a minimum increased in direct proportion to the number of additional strands per inch required to achieve a satisfactory, from the marking standpoint and the structural standpoint, stitching pattern. In the case of a flat woven product (which essentially all triple-layer products have been to date), the subsequent cost of joining needed to make the product endless for operation on the papermaking machine is also increased.

To date no known fabric has incorporated at one time all the qualities, that is maximum fiber support, uniform drainage paths, high permeability, good stretch resistance, and long life potential desirable, for the production of superior paper. It has long been desired to devise such a product for an economical cost that falls within the criteria established in the brown paper market. Since brown paper must be produced at a relatively low cost as compared to other papers, such a fabric would be ideal, and cost effective, for all types of paper.

Accordingly, it is an object of the present invention to provide a papermakers' forming fabric suitable for, but not restricted to, the formation of brown paper.

It is another object of the present invention to provide a papermakers' forming fabric having a papermaking surface with a high fiber support for effective forming and efficient release of the paper web.

Another object of the present invention is to provide a papermakers' forming fabric having uniform drainage paths through the structure from the sheet side surface to the machine side surface.

A further object of the present invention is to provide a papermakers' forming fabric with high permeability and high stretch resistance for effective draining and efficient cleaning with trouble-free running.

Another object of the present invention is to provide such a papermakers' forming fabric while maintaining a durable wear resistant machine element contacting surface.

Still another object of the present invention is to provide a papermakers' forming fabric, the economics of which fall well within that of even brown paper parameters.

SUMMARY OF THE INVENTION

The present invention is a multi-layer papermakers' forming fabric, particularly useful for the production of brown paper. The fabric, which could be classified as a true dual-layer fabric, incorporates a top papermaking surface fabric formed of relatively fine machine direction and cross machine direction yarns and a bottom machine equipment contacting surface fabric formed of relatively coarse machine direction and cross machine direction yarns. The fabric is a self-stitched construction in which selected top fabric layer cross machine direction yarns will descend to the bottom fabric layer and wrap around certain bottom fabric layer machine direction yarns to bind the two fabric layer together. The optimum geometric structure is achieved by designing and matching the top fabric layer and the bottom fabric layer such that ideal seating conditions and ideal self-stitching conditions are realized.

The ideal self-stitching condition between the top fabric layer and the bottom fabric layer is one in which the path of the self-stitch yarn is symmetrical and the elongation of the self-stitch yarn is minimal for the particular weave pattern combination. In an optimum location for the self-stitching, the distortion of the top fabric layer sheet surface will be minimized and the burial of the self-stitch yarn relative to the bottom fabric layer machine surface will be maximized. The proper self-stitch pattern will also produce a composite fabric having the required amount of structural integrity.

In a further embodiment of the fabric of the present invention, the ideal interface symmetry between the top fabric layer and the bottom fabric layer is one where the weaves are positioned such that the machine direction floats of the one fabric are interfaced against the cross machine direction floats of the other fabric in a 90 degree cross-shaped orientation made. It is this seating arrangement that optimizes the uniform drainage paths and the permeability needed to produce a good draining and easily cleaned forming fabric.

The invention will be further described with reference to the accompanying drawing, in which like reference numbers refer to like members throughout the various views.

DETAILED DESCRIPTION OF THE INVENTION

Figure 1A:
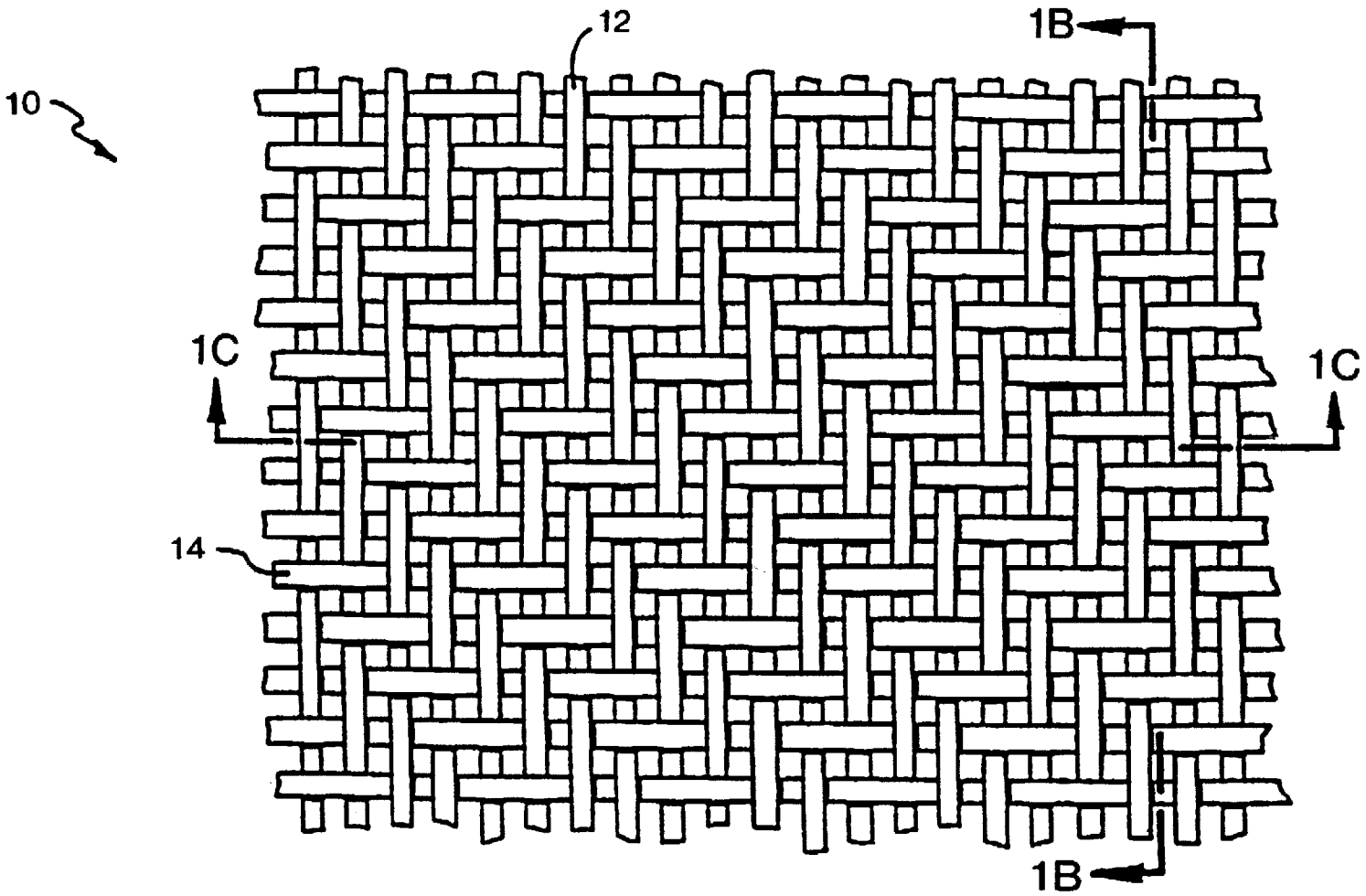
FIGS. 1a–1c illustrate the upper papermaking surface, a machine direction section, and a cross machine direction section, respectively, of the top fabric layer of one embodiment of the fabric of the present invention.

The invention will initially be described broadly, with a more detailed description following.

The present invention is a papermakers' forming fabric particularly useful for, but not restricted to, the formation of brown paper. The fabric has a high fiber support, uniform drainage paths, high permeability, high stretch resistance, good abrasion resistance, and can be produced at a cost that makes it economical as a brown paper forming fabric.

The fabric of the present invention is a self-stitched construction including two essentially distinct fabric layers, one on top of the other. The top layer that will form the papermaking surface incorporates relatively fine yarns in both the machine direction and the cross machine direction, which, in the preferred embodiment, are woven in a 2×2 weave pattern. The bottom fabric layer that will contact the machine elements incorporates relatively coarse yarns in the machine direction and the cross machine direction, also preferably in a 2×2 weave pattern. This fabric is essentially a hybrid double-layer structure in that each layer contains its own system of machine direction yarns and cross machine direction yarns. The only discontinuity in either layer occurs when selected cross machine direction yarns from the top fabric layer dive down and engage selected machine direction yarns from the bottom fabric layer to create the composite structure by binding the two layers together. No additional binding thread is necessary. The required ideal seating condition and ideal self-stitching condition are described with reference to the drawing below.

The machine direction yarns and the cross machine direction yarns used in the present invention are preferably synthetic yarns of materials conventionally used in such fabrics, such as polyamides (Nylon), polyesters (Dacron), and acrylic fibers (Orlon, Dynel and Acrilan), or co-polymers (Saran). The machine direction yarns and the cross machine direction yarns may be in the form of monofilament, multifilament or staple yarns or plied or wrapped yarns. The specific physical properties of the selected yarns, for example, modulus, elongation, free shrink and thermal shrink can be chosen to optimize the geometry configuration of the final fabric product.

The diameter of the yarns employed in the fabric for the present invention is determined by the position in the fabric structure. The machine direction yarns and the cross machine direction yarns in the top fabric layer are approximately equal in diameter and approximately half the size of the machine direction yarns and the cross machine direction yarns in the bottom fabric layer, those yarns also being approximately equal in diameter. In a preferred embodiment, the top fabric layer incorporates yarns that are 0.16 millimeter (machine direction) by 0.18 millimeter (cross machine direction) and the bottom fabric layer incorporates yarns that are 0.34 millimeter (machine direction) by 0.36 millimeter (cross machine direction). The size of the yarns in both systems can be increased or decreased to suit the individual requirements of a particular application for the papermaking fabric.

The weave pattern used in the preferred embodiment of the fabric of the present invention is a twill weave characterized by a diagonal line on the face of the fabric. Both the top fabric layer and the bottom fabric layer are 2×2 twill, meaning that the machine direction yarns go over two cross machine direction yarns and under two cross machine direction yarns in a repeating pattern. To achieve the stated goals of the ideal seating arrangement and the ideal self-stitching arrangement of the present invention, the twills in the mating fabrics will have a reverse orientation relative to each other, that is the upper surface of the top fabric layer is a right to left twill while the upper surface of the bottom fabric layer is a left to right twill or vice versa. In combination with the above-mentioned reversed twill criteria, the top fabric layer and the bottom fabric layer must be positioned relative to each other such that the relationship between the lower surface machine direction floats of the top fabric layer interface with the upper surface cross machine direction floats of the bottom fabric layer in a maximum contact same plane, essentially 90 degree cross shaped orientation mode, which provides ideal interface symmetry.

Figure 1B:
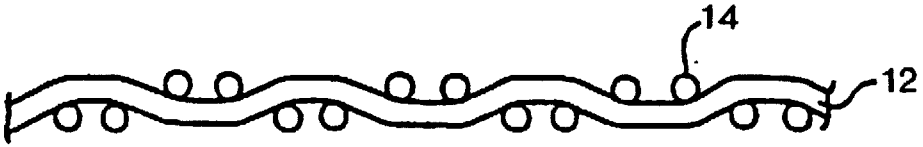
Figure 1C:
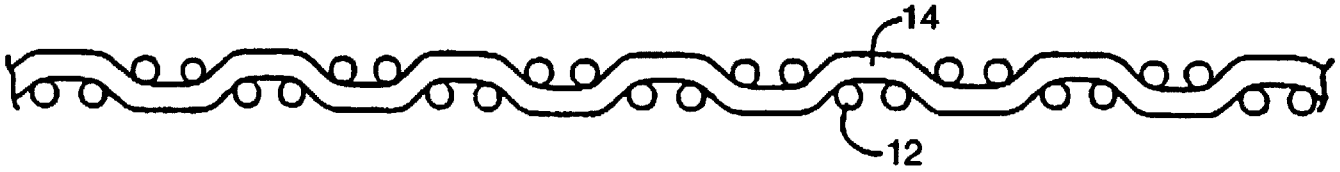

Turning now to the drawings, FIG. 1a illustrates the upper papermaking surface of the top fabric layer, FIG. 1b is a machine direction section (taken along line 1b—1b in FIG. 1a), and FIG. 1c is a cross machine direction section (taken along line 1c—1c in FIG. 1a), respectively, of the top fabric layer of one embodiment of the present invention. As stated above, the top fabric layer 10 includes relatively fine machine direction 12 and cross machine direction 14 yarns interwoven in a 2×2 twill weave pattern. The floats of cross machine direction yarn 14 can be seen across the papermaking surface view. Consistent with the 2×2 twill weave, these floats ascend from right to left across the fabric 10, constituting a right to left twill.

Figure 2A:
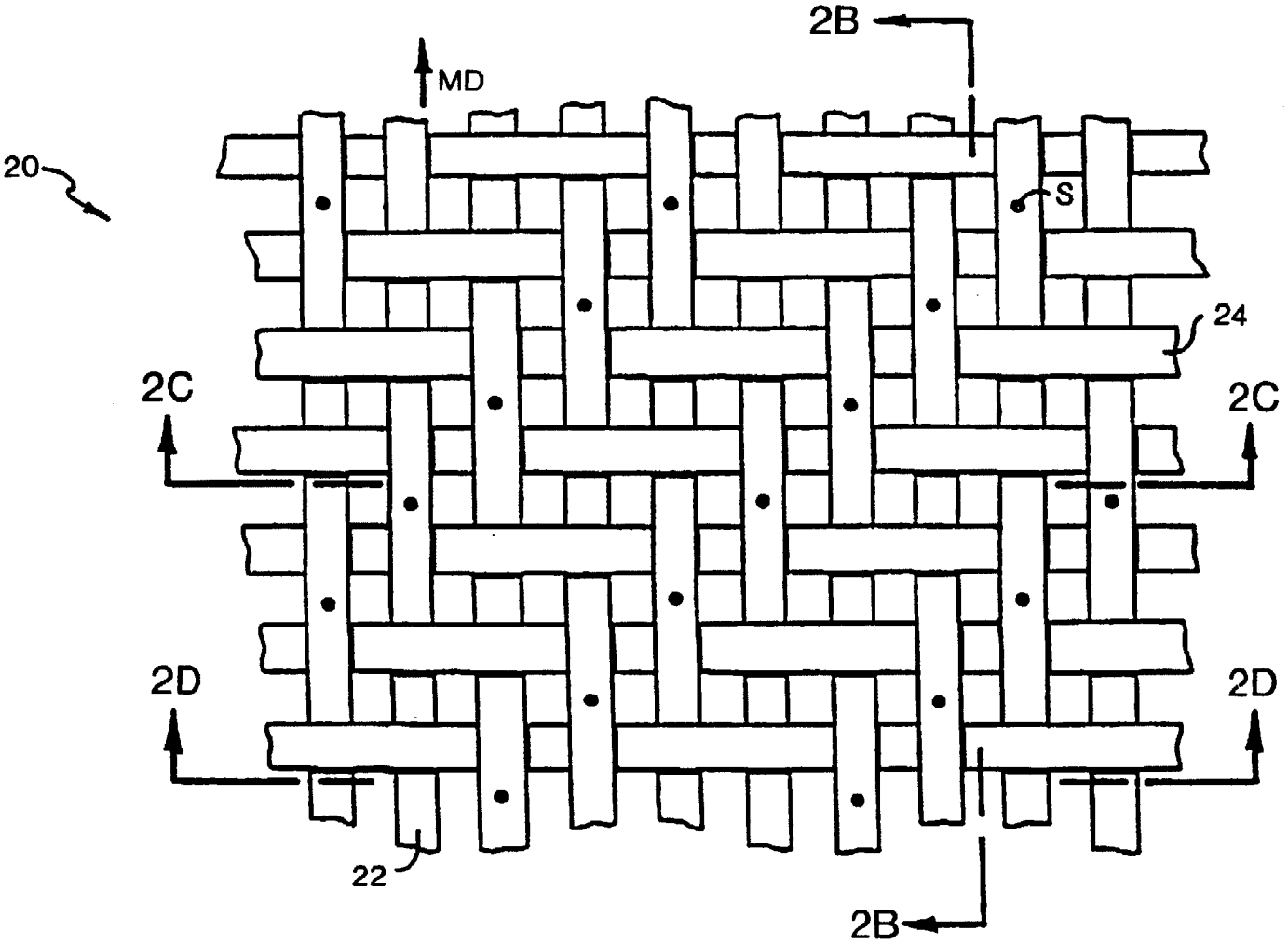
FIGS. 2a–2d illustrate the bottom fabric layer upper interfacing surface, a machine direction section, and two cross machine direction sections, respectively, of one embodiment of the fabric of the present invention.
Figure 2C:
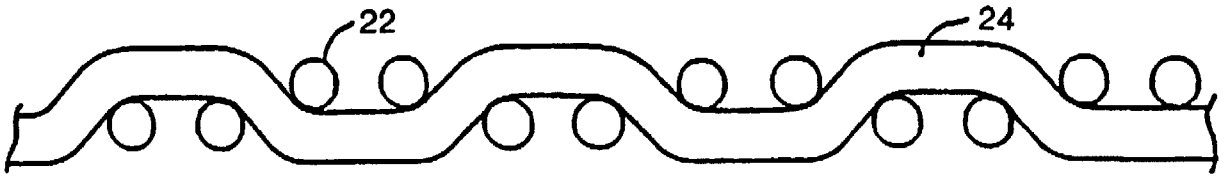
Figure 2B:
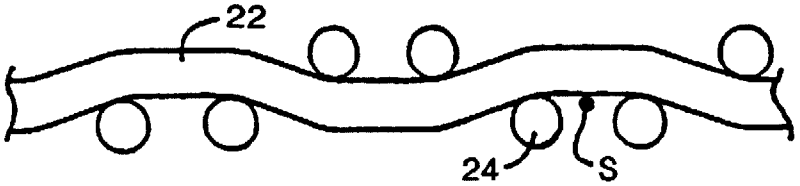
Figure 2D:
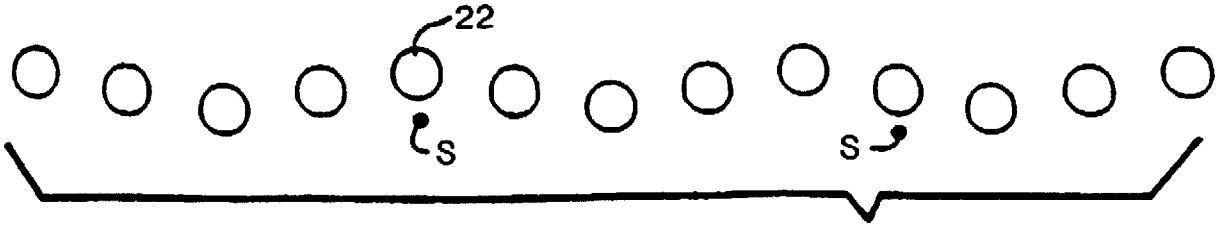

FIGS. 2a illustrates the upper interfacing surface of the bottom layer fabric, while FIG. 2b illustrates machine direction section (taken along the line 2b—2b in FIG. 2a), and FIGS. 2c and 2d illustrate cross machine direction sections (taken along the lines 2c—2c and 2d—2d in FIG. 2a), respectively, of the bottom fabric layer used in one embodiment of the fabric of the present invention. Again, the bottom fabric layer 20 includes relatively coarse machine direction 22 and cross machine direction 24 yarns interwoven in a 2×2 twill pattern. The floats of cross machine direction yarn 24 can be seen across the interfacing surface view in FIG. 2a. Consistent with the 2×2 twill weave, these floats ascend from left to right across the bottom fabric layer constituting a left to right twill which is the reverse of the right to left twill in the top fabric layer 10. Within the teachings of the present invention, a top fabric layer having a left to right twill could be mated with a bottom fabric layer having a right to left twill. The points marked "S" in three views represent a typical point where the fine cross machine direction yarn from the top fabric layer could descend to bind around the coarse machine direction yarn in the bottom fabric layer 20. Examination of these views will reveal a number of other "S" type locations which would satisfy the ideal self-stitch point requirements. The number of such locations actually utilized in the ultimate composite fabric is again dependent upon the stitching frequency needs determined feasible for the product application.

Figure 3A:
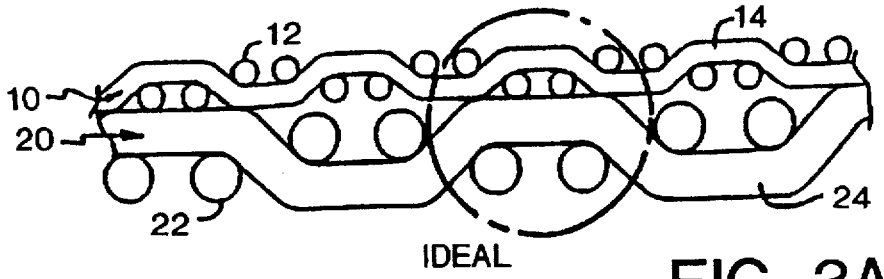
FIGS. 3a–3e illustrate the various seating arrangements possible for the cross machine direction yarn floats of the top fabric and bottom fabric layers for the fabric of the present invention.
Figure 3B:
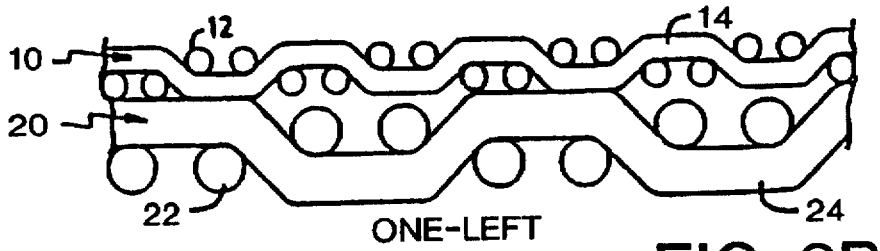
Figure 3C:
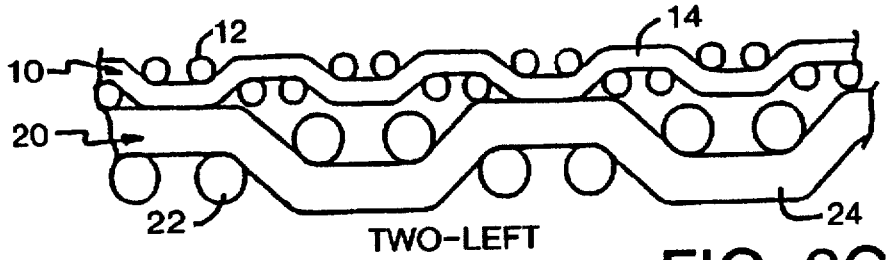
Figure 3D:
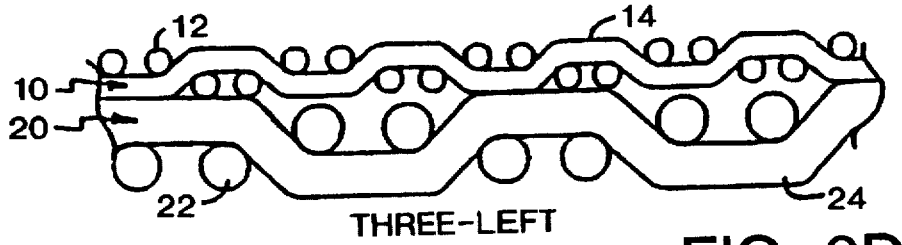
Figure 3E:
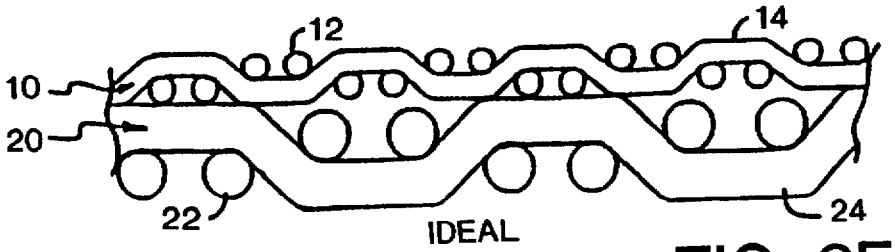

FIGS. 3a–3e illustrates the possible and the ideal seating arrangements between the top fabric layer 10 and the bottom fabric layer 20 at the stacked or overlying cross machine direction yarns. In each of these views, the top fabric layer machine direction yarns 12 and the bottom fabric layer machine direction yarns 22 are unstacked, that is each bottom fabric layer machine direction yarn 22 is intermediately spaced between a pair of top fabric machine direction yarns 12. Conversely, the non-stitching cross machine direction yarns 14 of the top fabric layer and the cross machine direction yarns 24 of the bottom fabric layer are stacked. That is, the bottom fabric layer cross machine direction yarn 24 is directly under the top fabric layer cross machine direction yarn 14. This is illustrated in FIG. 3a and FIG. 3e. There are twice as many cross machine direction yarns 14 in the top fabric layer 10 as there are cross machine direction yarns 24 in the bottom fabric layer 20. As described in lines 13–16 on page 7 of this specification, only selected top fabric layer cross machine direction yarns will descend to the bottom fabric layer and wrap around certain bottom fabric layer machine direction yarns to bind the two fabric layers together. Those selected cross machine direction yarns which descend ("stitchers") alternate with cross machine direction yarns which do not descend ("non-stitchers"). FIGS. 3a–3e show positions of only a non-stitching cross machine direction yarn of the top fabric layer relative to a cross machine direction yarn of the bottom fabric layer. This distinction is further explained by comparing FIGS. 3a–3e to FIGS. 6b and 6c. Within these bounds, the top fabric layer 10 can then be positioned relative to the bottom fabric 20 in four locals, labeled Ideal, One-Left, Two-Left, Three-Left, and Ideal again respectively. It should also be noted that only in the ideal position are the top fabric layer 10 and the bottom fabric layer 20 oriented such that both lower surface machine direction floats of the top fabric layer 10 interface with the upper surface cross machine direction floats of the bottom fabric layer in the prescribed maximum contact same plane, essentially 90 degree, cross shaped orientation mode, as shown in FIG. 5 and described below.

Figure 4:
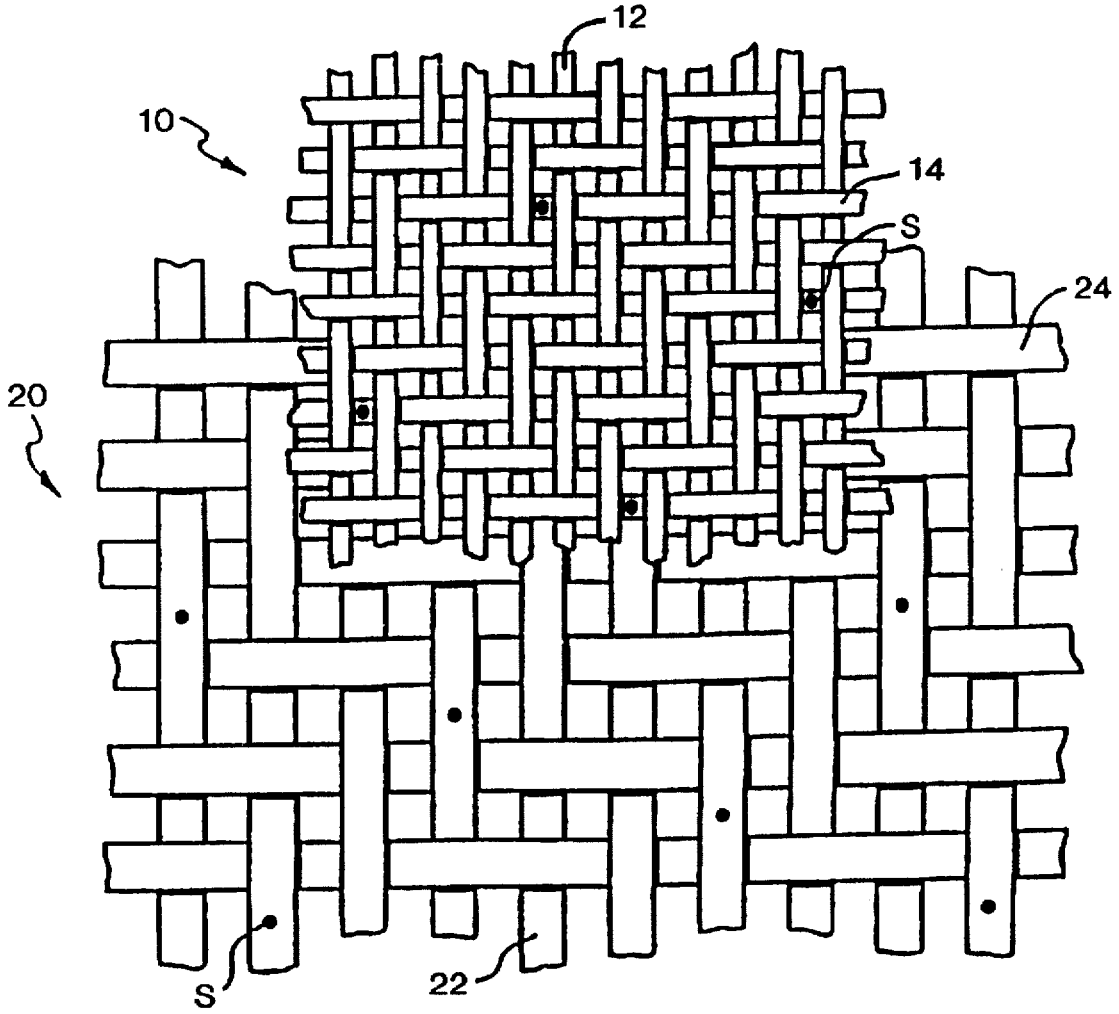
FIG. 4 illustrates the relationship between the papermaking surface of the top fabric layer and the interfacing surface of the bottom fabric layer showing the ideal seating arrangement utilized in the fabric of the present invention.

FIG. 4 illustrates the relationship between the papermaking surface of the top fabric layer 10 and the interfacing surface of the bottom fabric layer 20 where the above-described seating arrangement has been achieved. For further familiarization of the ideal self-stitch point concept, the self-stitching points used in the composite fabric structure of one embodiment of the present invention have been marked with a "o" and labeled "S". Once again, more or less self-stitching points could be utilized, provided they meet the ideal location criteria, depending upon the overall papermaking and structural requirements of the final composite forming fabric product.

Figure 5:
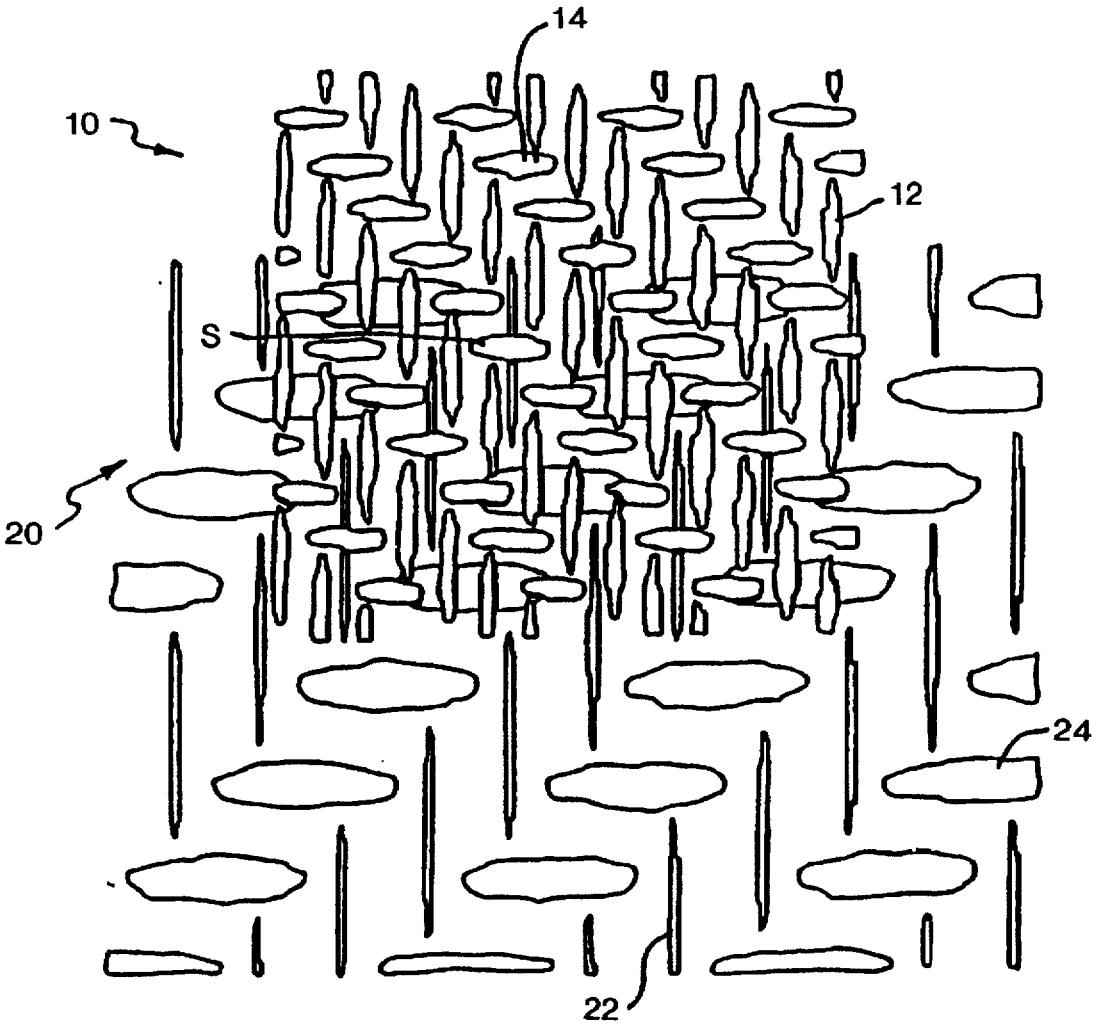
FIG. 5 illustrates the relationship between the bottom surface imprint of the top fabric layer and the top surface imprint of the bottom fabric showing the 90° seating arrangement layer of the fabric of the present invention.

FIG. 5 illustrates the relationship between the lower surface imprint of the top fabric layer 10 and the upper surface imprint of the bottom fabric layer 20 utilized in one embodiment of the present invention. The mating of these respective imprints indicate the areas where the yarns of the two fabric layers interface. Specifically, when the ideal seating arrangement has been achieved, the lower machine direction floats 12 of the top fabric layer 10 contact the upper cross machine direction floats 24 of the bottom fabric layer 20 in a maximum contact same plane, essentially 90 degree cross shaped orientation mode, the cross shape being shown in FIG. 5; this ideal interface area is circled in FIGS. 3a and 6b. Additionally, a typical ideal self-stitching point "S" where the fine cross machine direction yarn 14 of the top fabric layer 10 can most easily dip down, specifically dip further down from its already down position, to engage the machine direction yarn 22 of the bottom fabric layer 20 at its highest most accessible point is indicated by the "S" label. Once again, both the ideal seating arrangement and the ideal self-stitching points are representative typical positions which occur frequently within a pattern repeat. In a properly designed composite fabric, all the interfacing areas should satisfy the ideal seating arrangement criteria. However, the number of ideal self-stitching points "S" actually utilized within a pattern repeat will depend upon the ultimate objectives for the product.

Figure 6A:
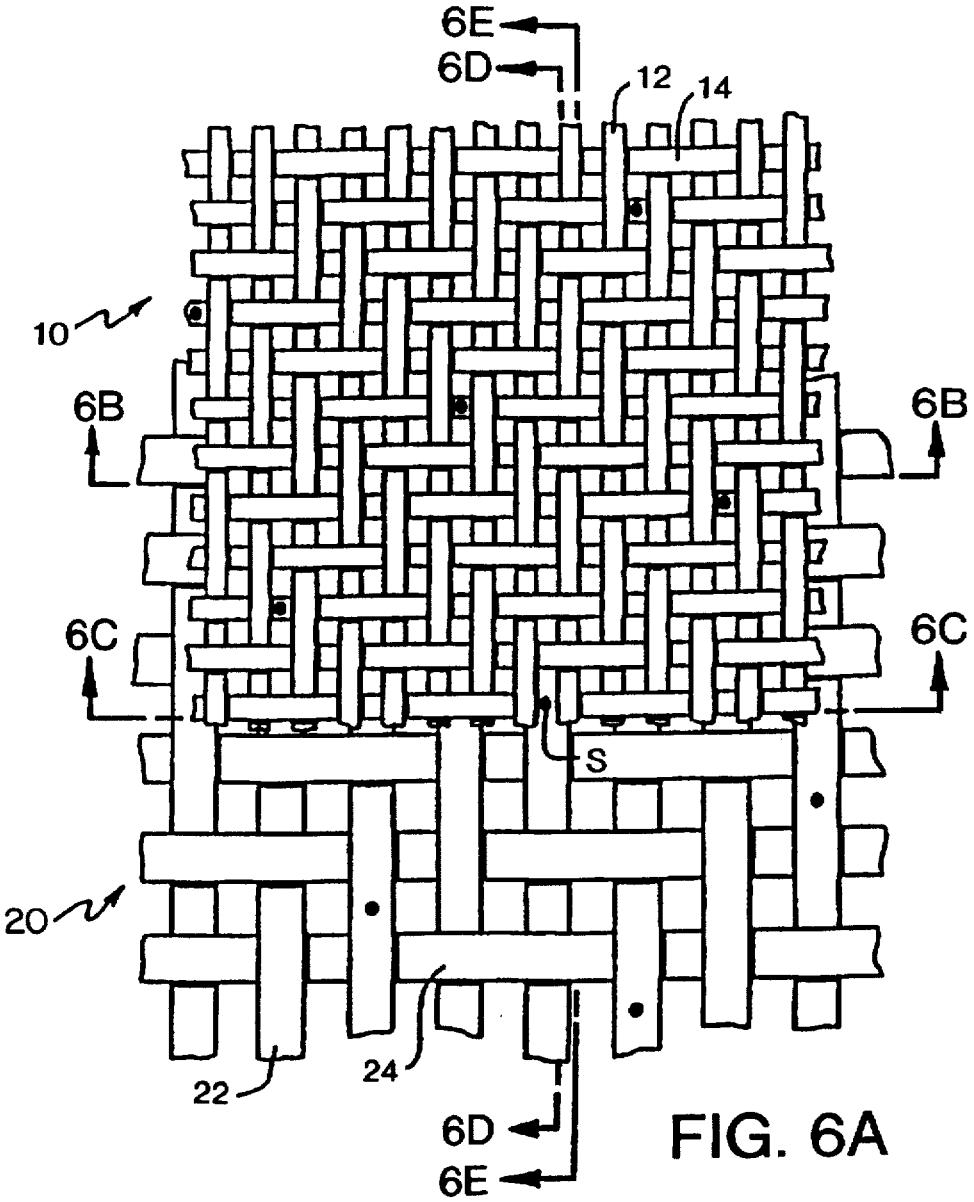
FIGS. 6a–6e illustrate the top fabric layer sheet making surface and the bottom fabric layer interfacing surface, two machine direction sections and two cross machine direction sections, respectively, of the preferred embodiment of the fabric of the present invention.
Figure 6B:
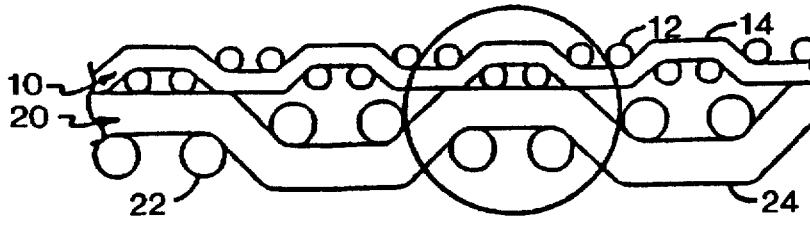

FIG. 6a illustrates the combined structure, specifically the relationship between the sheet making upper surface of the top fabric layer 10, and interfacing upper surface of the bottom fabric layer 20 of the preferred embodiment of the present invention where the above-described ideal seating arrangement has been achieved. For further familiarization of the ideal in the composite fabric structure of one embodiment of the present invention have been marked with an "o" and labeled "S". Once again, more or fewer self-stitching points could be utilized, provided they meet the ideal location criteria, depending upon the overall papermaking and structural requirements of the final composite forming fabric product. FIG. 6b, taken along line 6b—6b in FIG. 6a, and FIG. 6c, taken along line 6c—6c in FIG. 6a, illustrate two cross machine direction sections and FIG. 6d, taken along line 6d—6d in FIG. 6a, and FIG. 6e, taken along line 6e—6e in FIG. 6a, illustrate two machine direction sections of the preferred embodiment of the present invention.

Figure 6C:
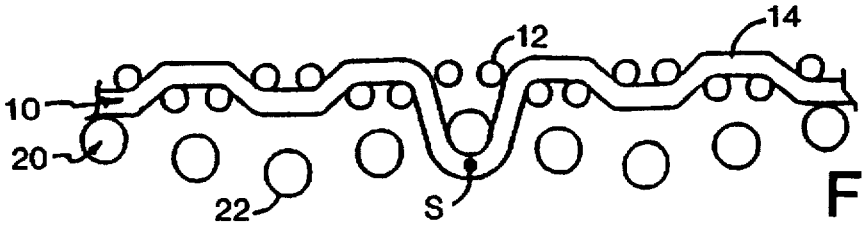
Figure 6D:
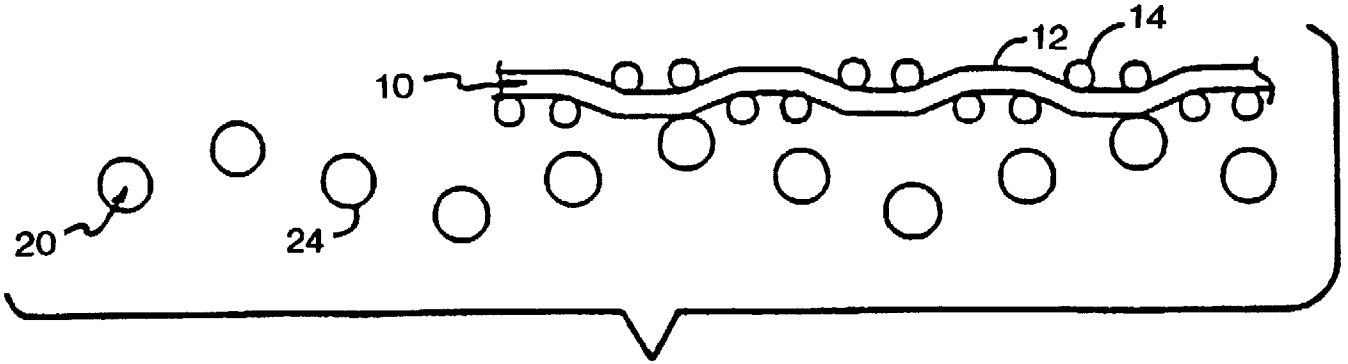
Figure 6E:
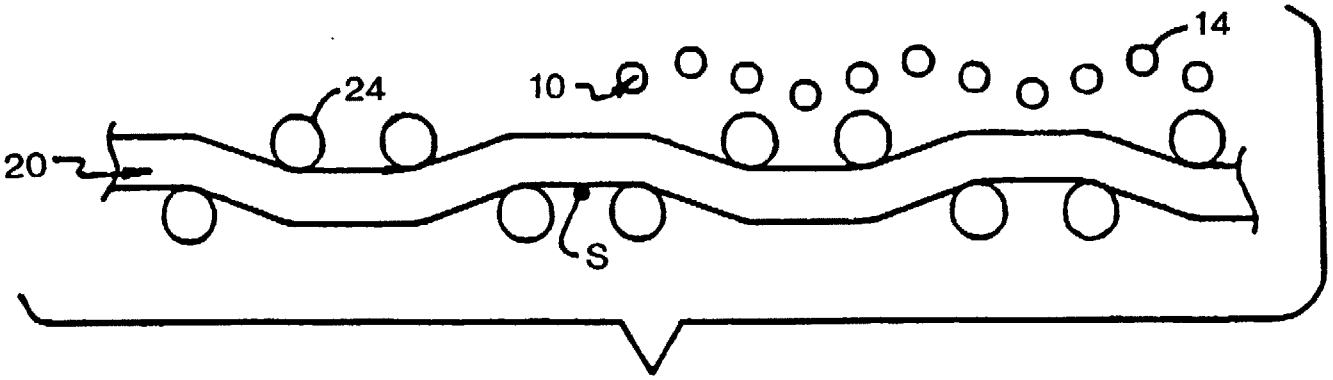

FIGS. 6b and 6c illustrate the paths of the two distinct cross machine direction yarns the non-stitching yarn in the former and the stitching yarn in the latter, and clearly show the role and positioning of these alternating cross machine direction yarns in this fabric. The typical ideal seating arrangement previously described is apparent in the cross machine direction section in FIG. 6b where there is a stacked relationship between the cross machine direction yarns 14 of the top fabric layer 10 and the cross machine direction yarns 24 of the bottom fabric layer 20. In there is FIG. 6c, no bottom fabric layer 20 cross machine direction yarn 24 below the fabric layer 10 cross machine direction yarn 14 which in this case is a stitching yarn as-are all alternating top fabric layer 10 cross machine direction yarns 14. The typical ideal self-stitching point marked "S" is apparent in FIG. 6a, FIG. 6c and in FIG. 6e. In the embodiment of the present invention shown in FIGS. 6a–6e, the self-stitching is done by each self-stitching top fabric layer cross machine direction yarn 14 on every eighth bottom fabric layer machine direction yarn 22 so that, with the alternating nature of the stitching pattern, every machine direction yarn 22 in the bottom fabric layer 20 is eventually interlaced with every other cross machine direction yarn 14 from the top fabric layer 10 within the confines of one pattern repeat. It can also be seen that the self-stitch provided by every other fine cross machine direction yarn 14 from the top fabric layer 10 is merely an extension from its already down or under float position which allows it to descend somewhat further down to interlace with the machine direction yarn 22 in the bottom fabric layer 20 which is at that point in its highest position. At its highest position, or elevation, in its weave repeat, the machine direction yarn 22 in the bottom fabric 20 is optimally accessible. The elevation of representative machine direction yarns relative to each other in a weave repeat is shown in FIG. 2D. As can be seen in that figure, a possible stitch point occurs when the machine direction yarn is at a highest elevation compared to the other machine direction yarns in the weave repeat. This combination gives the minimal elongation of the self-stitch yarn over a symmetrically uniform path. Having the self-stitch cross machine direction yarn 14 of the top fabric layer 10 located midway between the surrounding cross machine direction yarns 24 in the bottom fabric layer 20 also contributes to the structural integrity of the resultant composite fabric (see FIG. 6e).

Figure 7:
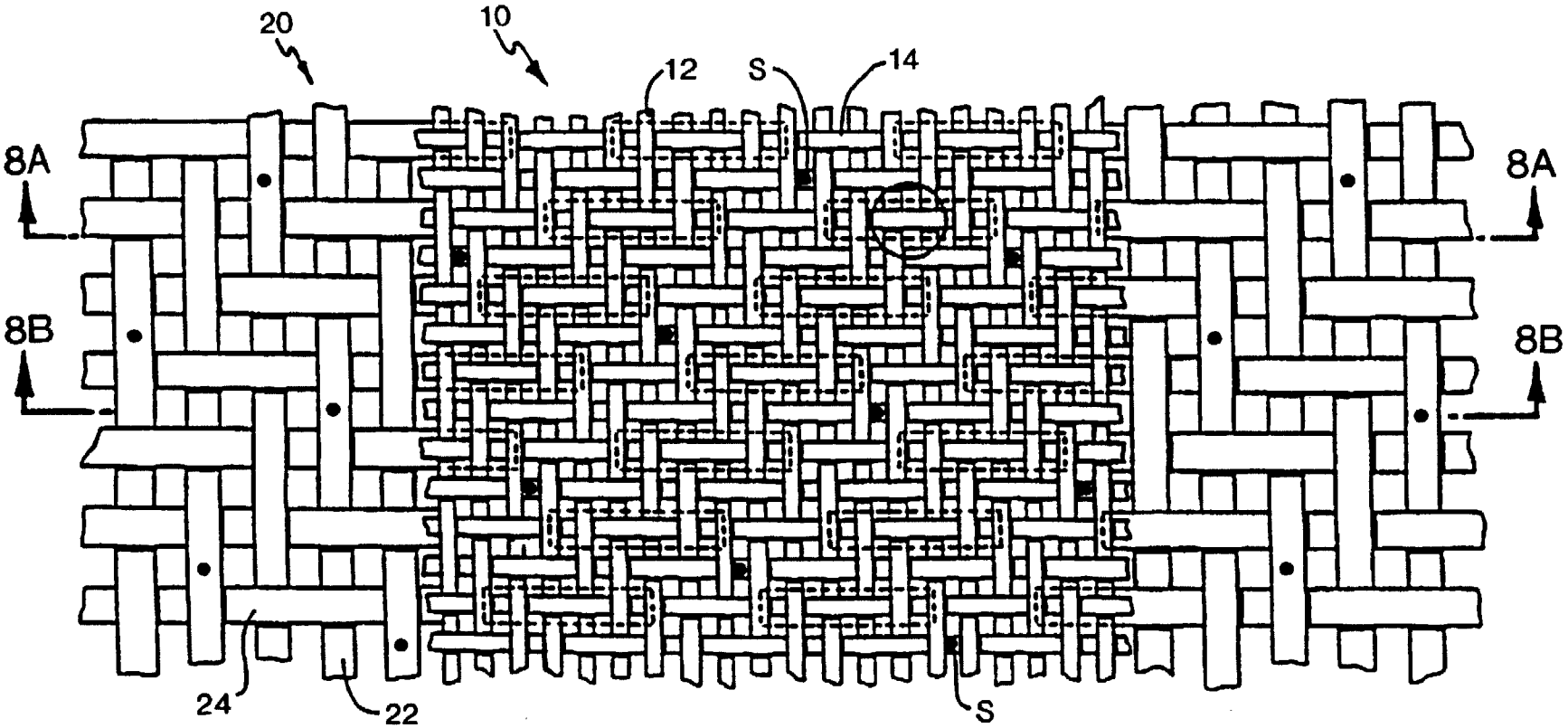
FIG. 7 illustrates the papermaking surface view of the top fabric layer overlaid on the interfacing surface view of the bottom fabric layer of the preferred embodiment of the fabric, as also shown in FIGS. 6a–6e.

FIG. 7 illustrates the combined structure with the papermaking surface of the top fabric layer 10 overlaid on the interfacing surface of the bottom fabric layer 20 and the self-stitch points marked with an "o" and labeled "S". A typical ideal seating arrangement will produce a situation where the lower floats of the machine direction yarns 12 in the top fabric layer 10 interface with the upper float of the cross machine direction yarn 24 in the bottom fabric layer 20 in the required 90 degree cross-shaped orientation mode, as shown within the circled area. The skilled observer can see that this ideal seating arrangement condition occurs numerous times within a pattern repeat of the present invention. The ideal self-stitching points, marked "o" and labeled "S" typically, also occur quite frequently within a pattern repeat. However, in the preferred embodiment of the present invention, the utilized frequency of these ideal self-stitching points which exist along every other fine cross machine direction yarn 14 in the top fabric layer 10 is once every sixteen machine direction yarns 12 in the top fabric layer 10 and once every eight machine direction yarns 22 in the bottom fabric layer 20. Given the staggered nature of the self-stitching pattern, the net result is that at some point along every machine direction yarn 22 in the bottom fabric layer 20 an interlace is achieved with the top fabric layer 10 within a pattern repeat. This self-stitching frequency can be increased or decreased, always using the ideal self-stitching points only, depending upon the particular application for the final product.

Figure 8A:
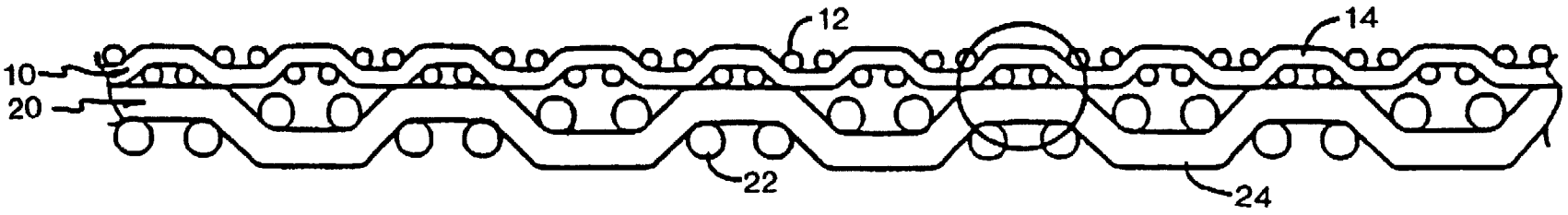
FIG. 8a illustrates a cross machine section of the fabric of FIG. 7, taken along the line 8a—8a in FIG. 7
Figure 8B:
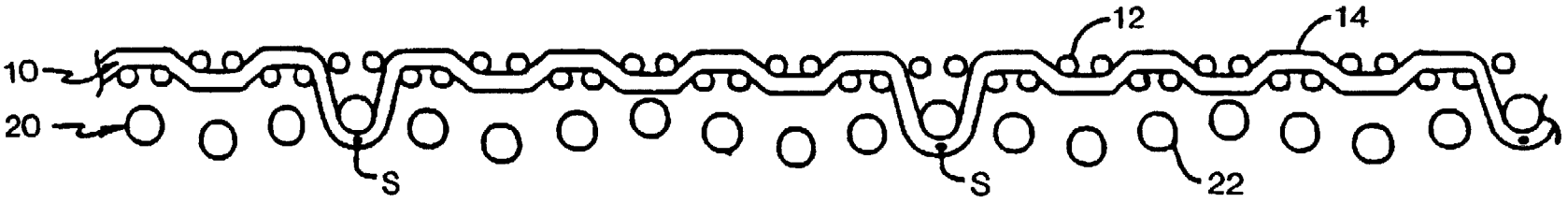
FIG. 8b illustrates a cross machine section of the fabric of FIG. 7, taken along the line of 8b—8b in FIG. 7.

FIGS. 8a and 8b illustrate the two configurations, non-stitching and stitching for the cross machine direction yarns 14 of the top fabric layer 10 as they relate to the bottom fabric layer 20 in the preferred embodiment of the present invention. FIG. 8a illustrates the cross machine direction yarns 14 of the composite fabric taken along line 8a—8a in FIG. 7 at the stacked, non-stitching position and FIG. 8b, taken along line 8b—8b in FIG. 7, shows the intermediately spaced self-stitching yarns cross machine direction yarn 14 of the top fabric layer 10. The typical ideal seating arrangement is circled and the typical self-stitching point is marked "o" and labeled "S".

Within the context of the present invention, only fabrics having 2×2 twill weaves have been illustrated herein; however, the teachings described herein are not restricted to just 2×2 twill weaves. In other words, the principles of ideal seating arrangement, self-stitch alignment, and interface symmetry can be successfully applied over a broad range of weave patterns, not necessarily the same for each layer, in creating similar composite papermaking fabrics. Where the espoused guidelines are judiciously applied, a superior papermaking product can be produced. While the fabric herein described constitutes the preferred embodiment of the invention, it is to be understood that the invention is not limited to the precise fabric described and that changes may be made herein without departing from the scope of the invention.

What is claimed is:

1. An endless *layer* papermaking fabric comprising:

a top fabric layer including relatively fine machine direction yarns interwoven with relatively fine cross machine direction yarns in a repeating pattern to form an upper surface and a lower surface, the top fabric layer cross machine direction yarns including alternately stitching and non-stitching cross machine direction yarns;

a bottom fabric layer including relatively coarse machine direction yarns interwoven with relatively coarse cross machine direction yarns in a repeating pattern to form an upper surface and a lower surface;

the number of the relatively fine top fabric layer cross machine direction yarns being approximately twice that of the relatively coarse bottom fabric layer cross machine direction yarns;

wherein said top fabric layer cross machine direction yarns travel singly and engage selected machine direction yarns of the bottom fabric layer at a highest elevation relative to the elevation of the machine direction yarns of the bottom fabric layer other than said selected machine direction yarns to bind the fabric layers together.

2. The papermaking fabric of claim 1 wherein the top fabric layer is a 2×2 twill weave.

3. The papermaking fabric of claim 2 wherein the bottom fabric layer is a 2×2 twill weave.

4. The papermaking fabric of claim 3 wherein the top fabric layer machine direction yarns are approximately 0.16 millimeter, the top fabric layer cross machine direction yarns are approximately 0.18 millimeter, the bottom fabric layer machine direction yarns are approximately 0.34 millimeter and the bottom fabric cross machine direction yarns are approximately 0.36 millimeter in diameter.

5. The papermaking fabric of claim 3 wherein the upper surface of the top fabric layer is a right to left twill and the upper surface of the bottom fabric layer is a left to right twill.

6. The papermaking fabric of claim 3 wherein the twill of the upper surface of the top fabric layer is opposite to the twill of the upper surface of bottom fabric layer.

7. The papermaking fabric of claim 1 wherein every other cross machine direction yarn of the top fabric layer engages every eighth machine direction yarn in the bottom fabric layer and every machine direction yarn in the bottom fabric layer is interlaced with every other cross machine direction yarn of the top fabric layer within one weave repeat.

8. An endless papermaking fabric comprising:

a top fabric layer including relative fine machine direction yarns interwoven with relatively fine cross machine direction yarns in a repeating pattern to form an upper surface and a lower surface, the top fabric layer cross machine direction yarns including alternating stitching and non-stitching cross machine direction yarns the upper surface including machine direction and cross machine direction floats and the lower surface including machine direction and cross machine direction floats;

a bottom fabric layer including relatively coarse machine direction yarns interwoven with relatively coarse cross machine direction yarns in a repeating pattern to form an upper surface and a lower surface, the upper surface including machine direction and cross machine direction floats and the lower surface including machine direction and cross machine direction floats;

the number of relatively fine top fabric layer cross machine direction yarns being approximately twice that of the relatively coarse bottom fabric layer cross machine direction yarns;

wherein said top fabric layer cross machine direction yarns engage selected machine direction yarns of the bottom fabric layer at a highest elevation relative to the elevation of the machine direction yarns of the bottom fabric layer other than said selected machine direction yarns to bind the fabric layers together; and wherein the lower surface machine direction floats of the upper fabric layer contact the upper surface cross machine direction floats of the bottom fabric layer in a maximum contact same plane configuration.

9. The papermaking fabric of claim 8 wherein the maximum contact same plane configuration is a 90 degree cross-shaped orientation mode.

10. The papermaking fabric of claim 9 wherein the top fabric layer is a 2×2 twill weave.

11. The papermaking fabric of claim 10 wherein the bottom fabric layer is a 2×2 twill weave.

12. The papermaking fabric of claim 11 wherein the top fabric layer machine direction yarns are approximately 0.16 millimeter, the top fabric layer cross machine direction yarns are approximately 0.18 millimeter, the bottom fabric layer machine direction yarns are approximately 0.34 millimeter and the bottom fabric cross machine direction yarns are approximately 0.36 millimeter in diameter.

13. The papermaking fabric of claim 11 wherein the upper surface of the top fabric layer is a right to left twill and the upper surface of the bottom fabric layer is a left to, right twill.

14. The papermaking fabric of claim 11 wherein the twill of the upper surface of the top fabric layer is opposite to the twill of the upper surface of bottom fabric layer.

15. The papermaking fabric of claim 9 wherein every other cross machine direction yarn of the top fabric layer engages every eighth machine direction yarn in the bottom fabric layer and every machine direction yarn in the bottom fabric layer is interlaced with every other cross machine direction yarn of the top fabric layer within one weave repeat.

*16. An endless papermaking fabric comprising:*

*a top fabric layer including relatively fine machine direction yarns interwoven with relatively fine cross machine direction yarns in a repeating pattern to form a 2×2 twill with an upper surface and a lower surface, the top fabric layer cross machine direction yarns including stitching and non-stitching cross machine direction yarns;*

*a bottom fabric layer including relatively coarse machine direction yarns interwoven with relatively coarse cross machine direction yarns in a repeating pattern to form an upper surface and a lower surface;*

*the number of the relatively fine top fabric layer cross machine direction yarns being approximately twice that of the relatively coarse bottom fabric layer cross machine direction yarns;*

*wherein said top fabric layer cross machine direction yarns travel singly in said 2×2 twill pattern to engage the top fabric layer machine direction yarns and engage selected machine direction yarns of the bottom fabric layer at a highest elevation relative to the elevation of the machine direction yarns of the bottom fabric layer other than said selected machine direction yarns to bind the fabric layers together.*

*17. The papermaking fabric of claim 16 wherein the bottom fabric layer is a 2×2 twill weave.*

*18. The papermaking fabric of claim 17 wherein the top fabric layer machine direction yarns are approximately 0.16 millimeter, the top fabric layer cross machine direction yarns are approximately 0.18 millimeter, the bottom fabric layer machine direction yarns are approximately 0.34 millimeter and the bottom fabric cross machine direction yarns are approximately 0.36 millimeter in diameter.*

*19. The papermaking fabric of claim 17 wherein the upper surface of the top fabric layer is a right to left twill and the upper surface of the bottom fabric layer is a left to right twill.*

*20. The papermaking fabric of claim 17 wherein the twill of the upper surface of the top fabric layer is opposite to the twill of the upper surface of the bottom fabric layer.*

*21. The papermaking fabric of claim 16 wherein every other cross machine direction yarn of the top fabric layer engages every eighth machine direction yarn in the bottom fabric layer and every machine direction yarn in the bottom fabric layer is interlaced with every other cross machine direction yarn of the top fabric layer within one weave repeat.*

*22. An endless papermaking fabric comprising:*

*a top fabric layer including relative fine machine direction yarns interwoven with relatively fine cross machine direction yarns in a repeating pattern to form an upper surface and a lower surface, the top fabric layer cross machine direction yarns including stitching and non-stitching cross machine direction yarns, the upper surface including machine direction and cross machine direction floats and the lower surface including machine direction and cross machine direction floats;*

*a bottom fabric layer including relatively coarse machine direction yarns interwoven with relatively coarse cross machine direction yarns in a repeating pattern to form an upper surface and a lower surface, the upper surface including machine direction and cross machine direction floats, and the lower surface including machine direction and cross machine direction floats;*

*the number of relatively fine top fabric layer cross machine direction yarns being approximately twice that of the relatively coarse bottom fabric layer cross machine direction yarns;*

*wherein said top fabric layer cross machine direction yarns engage selected machine direction yarns of the bottom fabric layer at a highest elevation relative to the elevation of the machine direction yarns of the bottom fabric layer other than said selected machine direction yarns to bind the fabric layers together; and*

*wherein the lower surface machine direction floats of the upper fabric layer contact the upper surface cross machine direction floats of the bottom fabric layer in a maximum contact same plane configuration.*

*23. The papermaking fabric of claim 22 wherein the maximum contact same plane configuration is a 90 degree cross-shaped orientation mode.*

*24. The papermaking fabric of claim 23 wherein the top fabric layer is a 2×2 twill weave.*

*25. The papermaking fabric of claim 24 wherein the bottom fabric layer is a 2×2 twill weave.*

*26. The papermaking fabric of claim 25 wherein the top fabric layer machine direction yarns are approximately 0.16 millimeter, the top fabric layer cross machine direction yarns are approximately 0.18 millimeter, the bottom fabric layer machine direction yarns are approximately 0.34 millimeter and the bottom fabric cross machine direction yarns are approximately 0.36 millimeter in diameter.*

*27. The papermaking fabric of claim 26 wherein the upper surface of the top fabric layer is a right to left twill and the upper surface of the bottom fabric layer is a left to right twill.*

*28. The papermaking fabric of claim 25 wherein the twill of the upper surface of the top fabric layer is opposite to the twill of the upper surface of bottom fabric layer.*

*29. The papermaking fabric of claim 23 wherein every other cross machine direction yarn of the top fabric layer engages every eighth machine direction yarn in the bottom fabric layer and every machine direction yarn in the bottom fabric layer is interlaced with every other cross machine direction yarn of the top fabric layer within one weave repeat.*

* * * * *